United States Patent
Chen et al.

(10) Patent No.: US 10,367,838 B2
(45) Date of Patent: Jul. 30, 2019

(54) REAL-TIME DETECTION OF ABNORMAL NETWORK CONNECTIONS IN STREAMING DATA

(71) Applicant: NEC Laboratories America, Inc., Princeton, NJ (US)

(72) Inventors: Zhengzhang Chen, Princeton Junction, NJ (US); LuAn Tang, Pennington, NJ (US); Guofei Jiang, Princeton, NJ (US); Kenji Yoshihira, Princeton, NJ (US); Haifeng Chen, Old Bridge, NJ (US)

(73) Assignee: NEC CORPORATION (JP)

(*) Notice: Subject to any disclaimer, the term of this patent is extended or adjusted under 35 U.S.C. 154(b) by 193 days.

(21) Appl. No.: 15/425,335

(22) Filed: Feb. 6, 2017

(65) Prior Publication Data

US 2017/0149814 A1  May 25, 2017

Related U.S. Application Data

(63) Continuation-in-part of application No. 15/098,861, filed on Apr. 14, 2016.

(60) Provisional application No. 62/148,232, filed on Apr. 16, 2015, provisional application No. 62/309,543, filed on Mar. 17, 2016.

(51) Int. Cl.
*H04L 12/00* (2006.01)
*H04L 29/06* (2006.01)
*H04L 12/24* (2006.01)

(52) U.S. Cl.
CPC .......... *H04L 63/1425* (2013.01); *H04L 41/12* (2013.01); *H04L 41/142* (2013.01); *H04L 41/145* (2013.01); *H04L 63/1408* (2013.01); *H04L 2463/121* (2013.01)

(58) Field of Classification Search
CPC ..... H04L 63/1425; H04L 41/12; H04L 41/15; H04L 43/16; H04L 2463/121; H04L 41/142; H04L 63/1408
USPC ........................................ 709/223, 227, 228
See application file for complete search history.

(56) References Cited

U.S. PATENT DOCUMENTS

| | | | | |
|---|---|---|---|---|
| 5,790,525 A * | 8/1998 | Ono | ..................... | H04L 49/3081 370/244 |
| 6,147,974 A * | 11/2000 | Matsumoto | ............. | H04M 3/36 370/252 |
| 7,930,746 B1 * | 4/2011 | Sheleheda | ........... | H04L 63/1425 713/151 |
| 8,620,314 B2 * | 12/2013 | Fok | ........................ | H04B 17/26 455/435.1 |

(Continued)

OTHER PUBLICATIONS

Yizhou Sun, et al., Mining Heterogeneous Information Networks: A Structural Analysis Approach, ACM SIGKDD Explorations Newsletter archive, Dec. 2012, pp. 20-28, vol. 14 Issue 2.

(Continued)

*Primary Examiner* — Frantz Coby
(74) *Attorney, Agent, or Firm* — Joseph Kolodka

(57) ABSTRACT

Methods and systems for detecting anomalous network activity include determining whether a network event exists within an existing topology graph and port graph. A connection probability for the network event is determined if the network does not exist within the existing topology graph and port graph. The network event is identified as abnormal if the connection probability is below a threshold.

19 Claims, 7 Drawing Sheets

(56) References Cited

U.S. PATENT DOCUMENTS

| | | | |
|---|---|---|---|
| 9,342,391 B2* | 5/2016 | Kim | G06F 21/552 |
| 2005/0195748 A1* | 9/2005 | Sanchez | H04L 41/5025 |
| | | | 370/252 |
| 2006/0109793 A1* | 5/2006 | Kim | H04L 41/145 |
| | | | 370/250 |
| 2007/0067438 A1* | 3/2007 | Goranson | H04L 63/1425 |
| | | | 709/224 |
| 2009/0249114 A1* | 10/2009 | Tsukada | G06F 11/2025 |
| | | | 714/4.1 |
| 2010/0031156 A1* | 2/2010 | Doyle | H04L 41/142 |
| | | | 715/736 |
| 2010/0138919 A1* | 6/2010 | Peng | H04L 29/12009 |
| | | | 726/22 |
| 2013/0117847 A1* | 5/2013 | Friedman | H04L 63/102 |
| | | | 726/22 |
| 2014/0215618 A1 | 7/2014 | Amit | |
| 2014/0245374 A1* | 8/2014 | Deerman | H04L 63/20 |
| | | | 726/1 |
| 2016/0219066 A1* | 7/2016 | Vasseur | H04L 63/1425 |

OTHER PUBLICATIONS

Ting Chen, et al., Integrating Community and Role Detection in Information Networks, in Proc of 2016 SIAM Int. Conf. on Data Mining (SDM'16), Miami, FL, May 2016.

* cited by examiner

REAL-TIME DETECTION OF ABNORMAL NETWORK CONNECTIONS IN STREAMING DATA

RELATED APPLICATION INFORMATION

This application claims priority to U.S. Ser. No. 62/148,232, filed on Apr. 16, 2015, to U.S. Ser. No. 62/309,543, filed on Mar. 17, 2016, and to U.S. Ser. No. 15/098,861, filed on Apr. 14, 2016, each of which is incorporated herein by reference in its entirety.

BACKGROUND

Technical Field

The present invention relates to computer and network security and, more particularly, to integrated discovery of node community and role in such networks.

Description of the Related Art

Enterprise networks are key systems in corporations and they carry the vast majority of mission-critical information. As a result of their importance, these networks are often the targets of attack. Communications on enterprise networks are therefore frequently monitored and analyzed to detect anomalous network communication as a step toward detecting attacks.

There are many challenges to overcome in detecting such communications. First, a typical enterprise network may include hundreds, or even many thousands, of hosts. Each host may generate hundreds of network connections in a second. The total data volume of a mid-sized enterprise network can easily reach terabyte scales in a matter of hours. In addition, enterprise networks may have very complex network structures, with both the network and the entities it connects evolving over time. The system needs to track these changes and maintain an accurate model. Furthermore, training data for automatically detecting anomalous activity is often unavailable or difficult to produce, and cannot recognize attacks that are not present in the training corpus.

Existing approaches to real-time threat detection suffer from a lack of accuracy, are inflexible in the face of changing attack patterns, or are otherwise unsuitable for use in large enterprise networks.

SUMMARY

A method for detecting anomalous network activity include determining whether a network event exists within an existing topology graph and port graph. A connection probability for the network event is determined if the network does not exist within the existing topology graph and port graph. The network event is identified as abnormal if the connection probability is below a threshold.

A method for detecting anomalous network activity includes determining whether a network event exists within an existing topology graph and port graph. A connection probability for the network event is determined using a processor if the network does not exist within the existing topology graph and port graph based on node stability, node diversity, and node similarity. The network event is identified as abnormal if the connection probability is below a threshold. An explanation of abnormal network events is generated. The topology graph and port graph if the network is not identified as abnormal.

A system for detecting anomalous network activity includes an anomaly detection module comprising a processor configured to determine whether a network event exists within an existing topology graph and port graph, to determine a connection probability for the network event if the network does not exist within the existing topology graph and port graph, and to identify the network event as abnormal if the connection probability is below a threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, the present embodiments detect abnormal activity in a network using graph-based security monitoring. Graph-based security monitoring employs a blue print graph model that includes a topology graph, recording the normal states of network connections among the hosts in the enterprise network, and a port graph, recording the relationship of the process that initializes the connection with its destination ports. Both graphs are constructed via streamed big data and are maintained dynamically. When a new network connection is detected, the present embodiments check a blue print graph and calculate a connecting probability that characterizes how likely it was for the connection to be established. If the connecting probability is low, the connection is reported as abnormal to end users. An explanation of the abnormal connection may also be provided based on the blue print model. In this manner, the present embodiments accurately detect abnormal connections in real time and do not need pre-collected training datasets, pre-defined models, or other such information in advance of detection.

Figure 1:
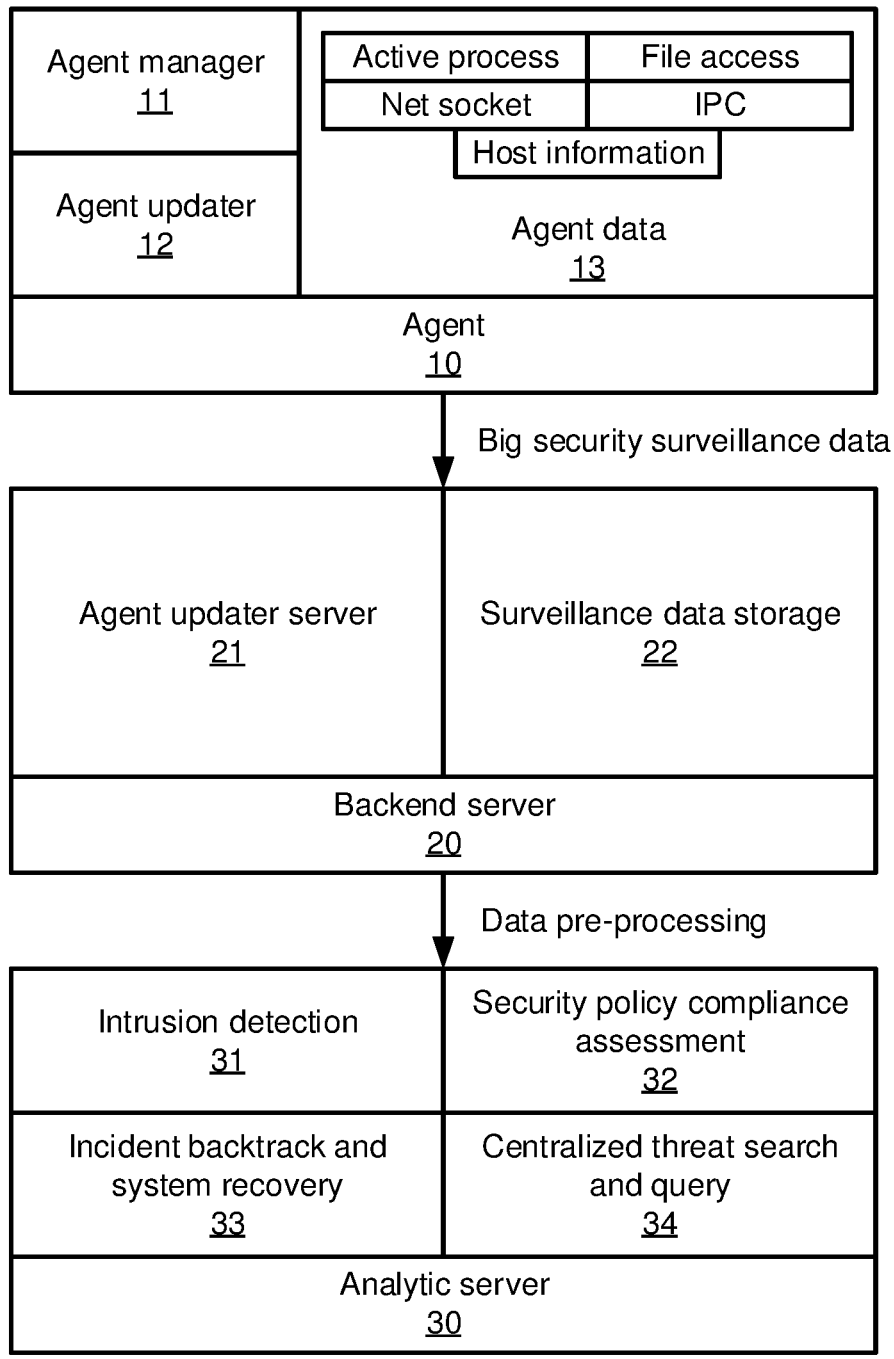
FIG. 1 is a block/flow diagram directed to an automatic security intelligence system architecture in accordance with the present principles.

Referring now in detail to the figures in which like numerals represent the same or similar elements and initially to FIG. 1, an automatic security intelligence system (ASI) architecture is shown. The ASI system includes three major components: an agent 10 is installed in each machine of an enterprise network to collect operational data; backend servers 200 receive data from the agents 10, pre-process the data, and sends the pre-processed data to an analysis server 30; and an analysis server 30 that runs the security application program to analyze the data.

Each agent 10 includes an agent manager 11, an agent updater 12, and agent data 13, which in turn may include information regarding active processes, file access, net sockets, number of instructions per cycle, and host information. The backend server 20 includes an agent updater server 21 and surveillance data storage. Analysis server 30 includes intrusion detection 31, security policy compliance assessment 32, incident backtrack and system recovery 33, and centralized threat search and query 34.

Figure 2:
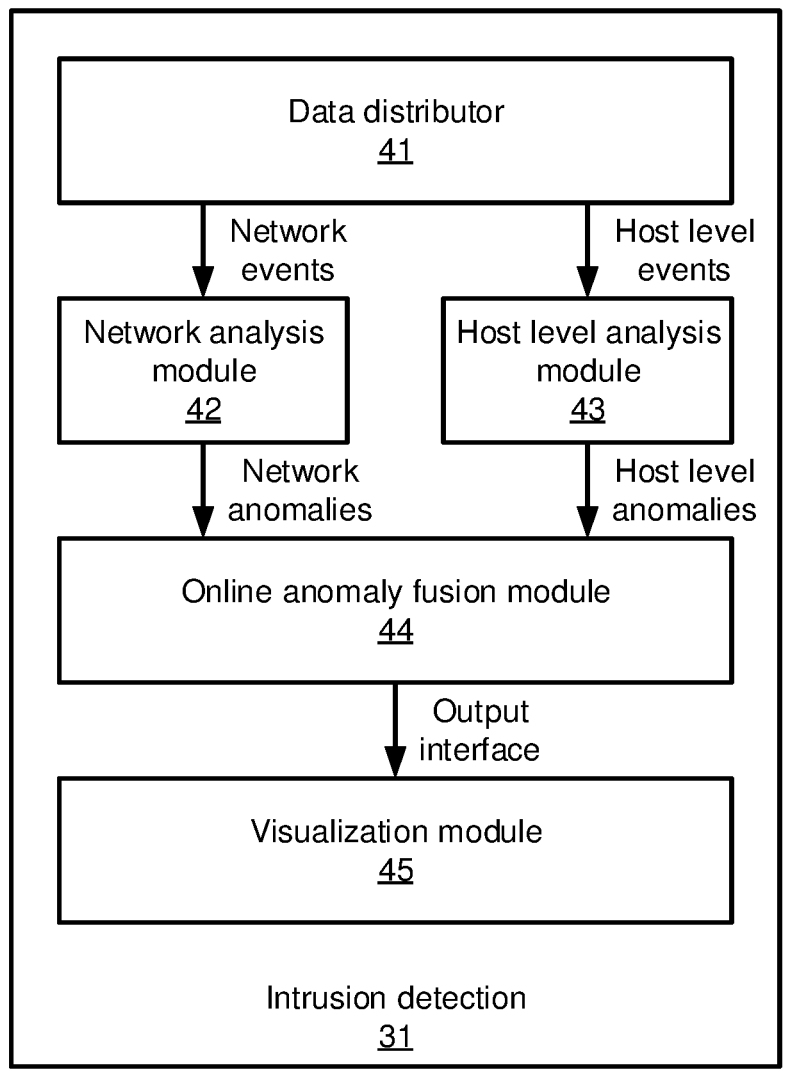
FIG. 2 is a block/flow diagram directed to an intrusion detection engine architecture in accordance with the present principles.

Referring now to FIG. 2, additional detail on intrusion detection 31 is shown. There are five modules in an intrusion detection engine: a data distributor 41 that receives the data from backend server 20 and distributes the corresponding to network level module 42 and host level module 43; network analysis module 42 that processes the network communications (including TCP and UDP) and detects abnormal communication events; host level analysis module 43 that processes host level events, including user-to-process events, process-to-file events, and user-to-registry events; anomaly fusion module 44 that integrates network level anomalies and host level anomalies and refines the results for trustworthy intrusion events; and visualization module 45 that outputs the detection results to end users.

Figure 3:
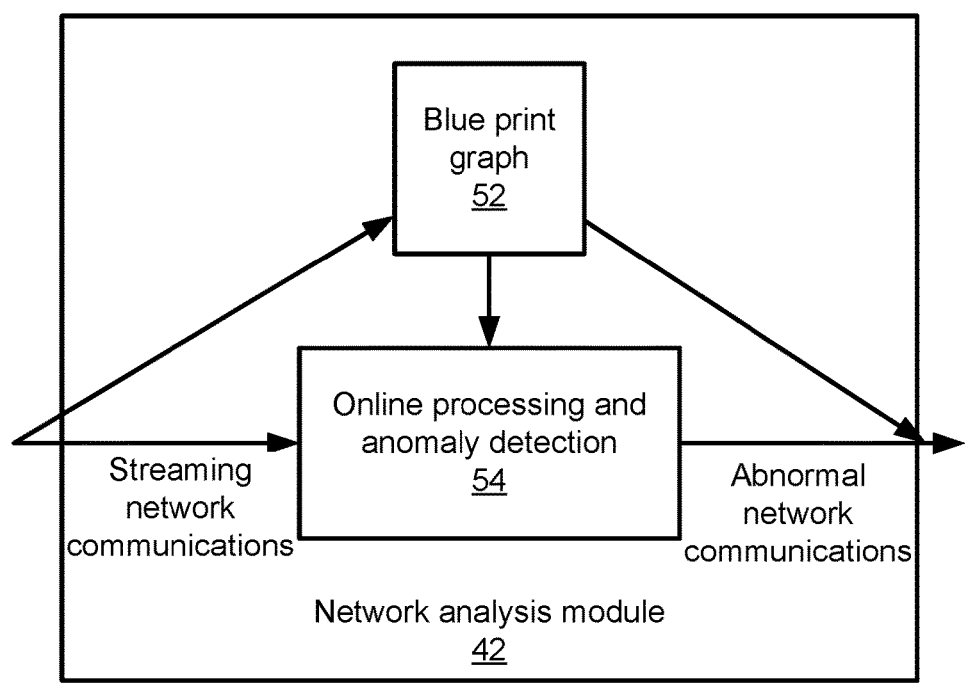
FIG. 3 is a block/flow diagram directed to a network analysis module architecture in accordance with the present principles.

Referring now to FIG. 3, additional detail on network analysis module 42 is shown. The network analysis module 42 includes at least two major components: a blue print graph 52 that includes both the topology graph and the port graph and an online processing and anomaly detection module 54 that takes incoming streaming network communication events as input, conducts analysis based on the blueprint graph, and outputs detected abnormal network communications (i.e., network anomalies).

The present embodiments construct the blue print graph using streaming data from across the enterprise network. These terms are defined as follows:

Network event: A network connection event e is a 7-tuple defined as, e=<src_ip, src_port, dst_ip, dst_port, connecting_process, protocol_num, timestamp>, where src_ip and src_port are the IP address and port of the source host, dst_ip and dst_port are the IP address and port of the destination host, connecting_process is the process that initialized the connection, protocol_num indicates the protocol of the connection, and timestamp records the connection time.

Topology graph: The topology blue print graph is defined as $G_t=<V, E>$, where V is the node set of hosts inside the enterprise network and E is the edge set. A host node v is a 3-tuple defined as, v=<host_id, ip, last_connection_time>, where host_id is an identifier for the host, ip is the IP address of the host, and last_connection_time records the timestamp of the latest network connection on the node. An edge l in the topology graph is a 4-tuple defined as, l=<edge_id, src_ip, dst_ip, last_connection_time>, where edge_id is an identifier for the edge, src_ip is the IP address of the source host, dst_ip is the IP address of the destination host, and last_connection_time records the timestamp of the last network connection on the edge.

Port graph: The port blue print graph is defined as $G_p=<V_p, V_d, E>$, where $V_p$ is the node set of processes that initialize the connection, $V_d$ is the node set of the destination port, and E is the edge set. A process node $v_p$ is a 2-tuple defined as, $v_p$=<process, last_connection_time>, where process identifies the process and last_connection_time records a timestamp of the latest network connection originating from the process. A destination port node $v_d$ is defined as, $v_d$=<port, last_connection_time>, where port identifies the destination port and last_connection_time records a timestamp of the latest network connection directed to the port. An edge l in the port graph is defined as l=<edge_id, process, port, last_connection_time>, where edge_id is an identifier for the edge, process is an identifier of a source process, port is an identifier of a destination port, and last_connection_time records a timestamp of the latest network connection between the source process and the destination port.

Node stability: If v is a node in the blue print graph and m is a fixed time window length, the time period between when v was added to the blue print graph and the present timestamp can be partitioned into a sequence of time windows, where each time window $T_i$ has a length m. If there is no new edge to or from the node v in a given time window $T_i$, then $T_i$ is defined as a stable window. Node stability is therefore defined in the below equations:

$$\sigma_{src}(v)=|T_{from}'|/|T|$$

$$\sigma_{dst}(v)=|T_{to}'|/|T|$$

There are two stability scores for each node, since a node that is not stable as source may be stable as the destination. For example, a host may constantly have new edges from it, however, there is no other host connects to it. In such a case, even the host has very low stability as a source, its stability score is very high as a destination. If there is suddenly a connection to this host, it is abnormal.

The range of node stability is [0,1], when a node has no stable window, i.e., the node always has new edges in every window, the stability is 0. If all the windows are stable, the node stability is 1. In realistic applications, the window length may be set at, e.g., 24 hours. Hence, the stability of a node is determined by the days that the node has no new edges and the total number of days. Note that the node stability can be easily maintained over the stream, the system only stores three numbers of $|T_{from}'|$, $|T_{to}'|$ and $|T|$ for each node, and updates every 24 hours. The time complexity of computing node stability is O(1).

Node diversity: A public server in the topology graph may have many edges. The likelihood is higher for such a node to have new edges. Node diversity characterizes this relationship. For a node v in the topology graph, $E_{from}(v)$ is the set of edges that connect from v and $E_{to}(v)$ is the set of edges that connect to v. Node diversity may then be defined as:

$$\theta_{src}(v)=|E_{from}(v)|/(|V|-1)$$

$$\theta_{src}(v)=|E_{from}(v)|/(|V|-1)$$

where |V| is the size of the node set in the topology graph. The range of node diversity in the topology graph is [0,1]. For a node with no edges, the diversity is zero, and if the node connects to every other node in the graph, the diversity is 1.

In the port graph, which is bipartite, for each edge the source is always a process node and the destination is always a port node. The process node diversity and the port node diversity are defined as:

$$\theta_{src}(v_p)=|E_{from}(v)|/|V_d|$$

$$\theta_{dst}(v_d)=|E_{to}(v)|/|V_p|$$

where $|V_d|$ is the size of the port node set and $|V_p|$ is the size of the process node set. The range of node diversity in port graph is also [0,1]. If a process connects to all the ports, or a port has connection from every process, the node diversity reaches the maximum as 1.

Node diversity can also be efficiently computed over the stream. The system stores total numbers of edges from/to each node and updates the number when a new edge is added to the graph. The time complexity of computing node diversity is O(1).

Node similarity: If $v_1$ and $v_2$ are two nodes of the same type in the blue print graph (e.g., both are host nodes, process nodes, or port nodes), then dst(v) and src(v) denote the destinations and sources that have edges from/to v. Node similarity is then defined as:

$$\gamma_{src}(v_1, v_2) = \frac{dst(v_1) \cap dst(v_2)}{dst(v_1) \cup dst(v_2)}$$

$$\gamma_{dst}(v_1, v_2) = \frac{src(v_1) \cap src(v_2)}{src(v_1) \cup src(v_2)}$$

The source similarity between two nodes is the Jaccard similarity of their destinations, and the destination similarity is the Jaccard similarity of the sources that have connected to both nodes. The range of node similarity is [0,1]. If both nodes have the same sources/destinations in blue print graph, their similarity is 1, if they have no common source/destination, the similarity is 0.

Connection probability: If e is a new connection event, G is a blue print graph, and $v_1$ and $v_2$ are source and destination nodes when matching e to G, the connection probability is defined as:

$$p(e|G)=1-\max(\varphi_{src}(v_1),\varphi_{dst}(v_2))$$

where $\varphi_{src}(v_1), \varphi_{dst}(v_2)$ are the source and destination abnormal scores of $v_1$ and $v_2$, which are defined as:

$$\varphi_{src}(v_1)=\sigma_{src}(v_1)*(1-\theta_{src}(v_1))*(1-\max_{v_j \in dst(v_1)}\gamma_{dst}(v_2, v_j))$$

$$\varphi_{src}(v_2)=\sigma_{src}(v_2)*(1-\theta_{src}(v_2))*(1-\max_{v_j \in dst(v_2)}\gamma_{src}(v_1, v_j))$$

where dst($v_1$) is the node of the destination that $v_1$ has connected to in the blue print graph G and src($v_2$) is the source node set that has connections to $v_2$.

The measure of node similarity is different from the measures of stability and diversity. In particular, whereas stability and diversity are defined on a single node, the similarity is a score that compares two nodes.

Figure 4:
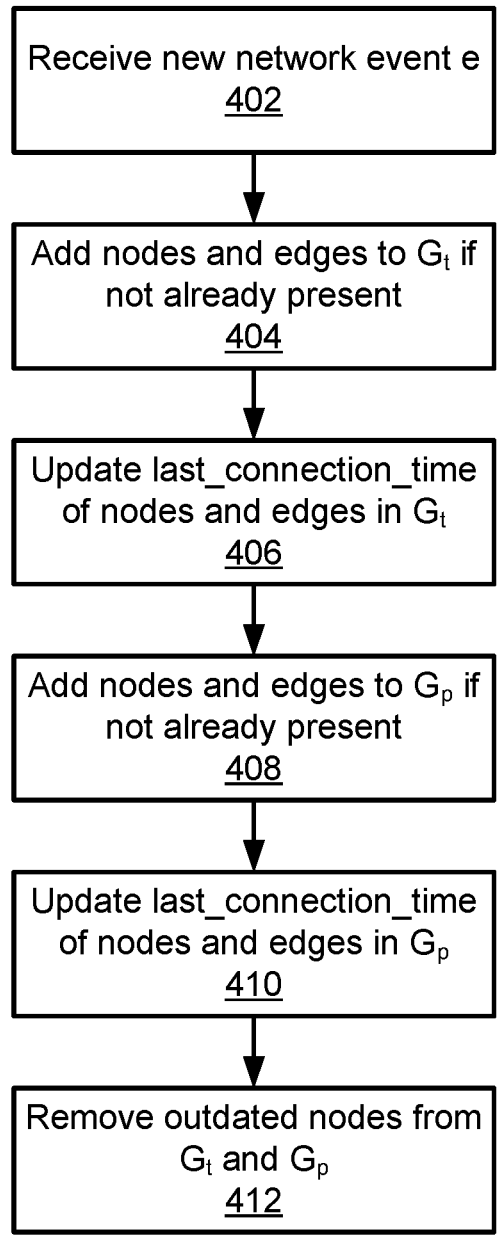
FIG. 4 is a block/flow diagram directed to a method of updating blue print graphs in accordance with the present principles.

Referring now to FIG. 4, a method for constructing and updating blue print graphs based on streaming data. Block 402 receives a new network event e. For each new network event, block 404 checks whether the topology graph $G_t$ includes the source and destination host nodes and whether $G_t$ includes an edge between the pair of nodes. If the nodes are absent from $G_t$, or if the edge between the nodes is absent, then block 404 adds whatever nodes or edges are missing. Block 406 updates last_connection_time for the nodes and edge based on the timestamp of the event e.

Similarly, block 408 checks whether the process node and port node of the event e as well as the edge between the nodes are present in the port graph $G_p$. If not, then block 408 adds such nodes and edges to $G_p$. Block 410 updates the last_connection_time of the nodes and edges in $G_p$ based on the timestamp of the event e. Once the graphs are updated in this manner, block 412 removes outdated nodes and edges from the graphs. A node or edge may be considered outdated if its last_connection_time indicates a timestamp that is too old. Thus, if a node or edge has no connection for a long period of time (e.g., a time longer than some threshold), then block 412 removes that node or edge. This process is repeated for each new event as it arrives so that the blue print graphs are continually maintained. The blue print graphs can be created initially by processing a historical record of events, for example in the form of a system event log. In addition, the topology graphs may be transferred from one enterprise network to another.

It should be noted that the blue print graphs do not need to store the total number of connection events between a pair of nodes. Because the content of the connections is not monitored, such a count could be misleading and is not meaningful. Because normal processes may initialize a large number of network connections along a given edge, this fact does not indicate abnormally high traffic on the edge.

The table below shows an exemplary list of network event samples from 11:30 am to 12:05 pm on a given day. These network events can be classified into two categories based on the dst_ip: if the dst_ip is in the range of enterprise network's IP addresses (138.15.xx.xx), the network event is an inside connection between two hosts of the enterprise network. If the dst_ip is not in the range, it is an outside connection between an internal host and an external host. In the table, e1, e3, e5 and e6 are inside connections and e2 and e4 are outside connections.

| Event | Src_ip | Src_port | Dst_ip | Dst_port | Proc. | Prot. | Timestamp |
|---|---|---|---|---|---|---|---|
| $e_1$ | 138.15.165.26 | 19820 | 138.15.165.226 | 445 | ntoskrnl.exe | 17 UDP | 2016-2-29 11:30:12 |
| $e_2$ | 138.15.165.32 | 1672 | 74.125.228.17 | 80 | chrome.exe | 6 TCP | 2016-2-29 11:35:09 |
| $e_3$ | 138.15.165.40 | 1823 | 138.15.165.235 | 445 | ntoskrnl.exe | 17 UDP | 2016-2-29 11:40:56 |
| $e_4$ | 138.15.165.27 | 621 | 101.125.228.17 | 80 | chrome.exe | 6 TCP | 2016-2-29 11:52:19 |
| $e_5$ | 138.15.165.28 | 8203 | 138.15.165.226 | 445 | ntoskrnl.exe | 17 UDP | 2016-2-29 12:02:09 |
| $e_6$ | 138.15.165.41 | 7625 | 138.15.165.235 | 445 | ntoskrnl.exe | 17 UDP | 2016-2-29 12:04:23 |

In this example, dst_ips of outside connections are diverse, but the dst_ips of inside connections are regular and show patterns. For example, the hosts belonging to the same group all connect to the private servers of the group, and they rarely connect to other groups' private servers. For both inside and outside connections, there is a binding relation on the process and the dst_port. For example, chrome.exe is used to load web pages and it usually connects to the dst_ports 80 and 8080. The process ntoskrnl.exe is used for windows network neighbor discovery and it always connects to the dst_port 445.

Network events such as these form the basis of the blue print graphs. The topology graph $G_t$ models the source and destination relationships of the connection events inside the network, while the port graph $G_p$ models the relationship between process and destination port of all the network connections.

Figure 5:
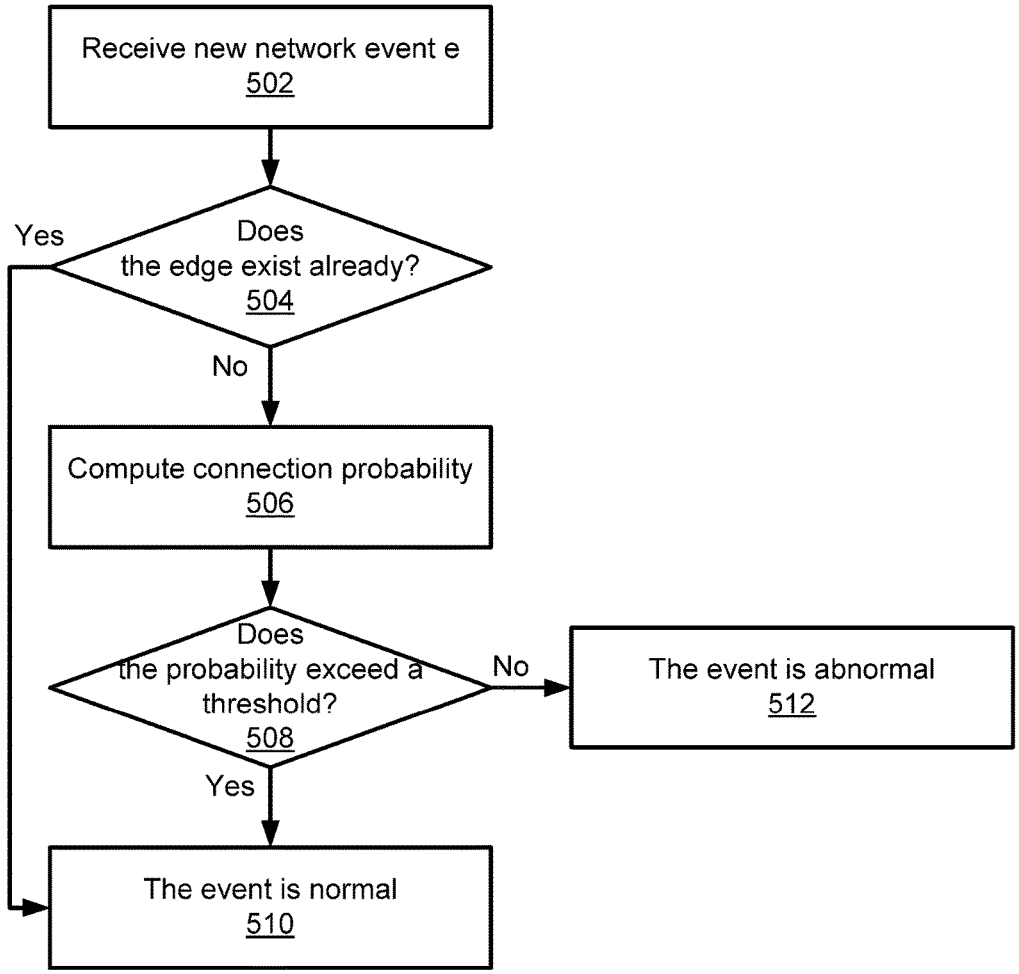
FIG. 5 is a block/flow diagram directed to a method of determining whether a network event is abnormal in accordance with the present principles.

Referring now to FIG. 5, a method of detecting abnormal connection activity is shown. Block 502 receives a new network event e. Block 504 determines whether the edge of the event e exists in the topology graph $G_t$ and the port graph $G_p$. If a match is found, then block 510 determines that a connection with the same topology and port information has been recorded before and that the event is a normal event. This may trigger the process of FIG. 4 to update the blue print graphs with the information of the event e.

If the event is not already represented by the blue print graphs, then the event represents an unseen relationship and block 506 calculates a connection probability for e. If block 508 determines that the probability is larger than a threshold, block 510 registers that the event is a normal event. If block 508 determines that the probability is below the threshold, block 512 determines that the event is abnormal. Block 512 may further generate a report as to the nature of the abnormal event (e.g., "the event has a previously unseen relationship on process X connections to the destination port Y").

Three factors may be used in computing the connection probability for a new edge: node stability, node diversity, and node similarity. These terms are defined above, with details for their calculation. Using these factors, block 508 determines the connection probability. For example, when a new edge is detected, block 508 checks the node similarity between the destination node and destination nodes that the source node has contacted before. If there is a high similarity to such a previously contacted node, then the probability between the source node and the destination node is more likely.

The computation cost of node similarity is higher than that of node diversity. If n is the total number of nodes in the graph, in the worst case where every pair of nodes in the blue print graphs is connected, node similarity calculations check n−1 nodes for each round of comparison and carries out n−1 rounds for a complexity of $O(n^2)$.

The complexity of this procedure can be reduced so that it can be performed in real-time. Let e be a new connection event, G be a blue print graph, $v_1$ and $v_2$ be source and destination nodes when matching e to G. The lower-bound of connection probability, $p_{low}(e|G)$, is defined as $$p_{low}(e|G)=1-\max((\varphi_{src}^{upp}(v_1),\varphi_{dst}^{upp}(v_2))$$

where $\varphi_{src}^{upp}(v_i)$, $\varphi_{dst}^{upp}(v_2)$ are the upper-bounds of $v_1$ and $v_2$'s abnormal scores, which are computed as:

$$p_{low}(e|G)=1-\max(\varphi_{src}^{upp}(v_1),\varphi_{dst}^{upp}(v_2))$$

$$\varphi_{dst}^{upp}(v_2)=\sigma_{dst}(v_2)*(1-\theta_{dst}(v_2))$$

Node stability and diversity can be computed in $O(1)$ time. Therefore, the system can efficiently compute the lower bound of connection probability $p_{low}(e|G)$ on streaming data. If $p_{low}(e|G)$ is larger than or equal to the given threshold, the connection event is definitely normal. Block 508 can let such events pass without further computation. Only when $p_{low}(e|G)$ is less than the given threshold does block 508 need to perform a more detailed computation of p(e|G) to further decide whether e is abnormal or not. Thus, the time cost will reduce significantly by adding a filter based on $p_{low}(e|G)$.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
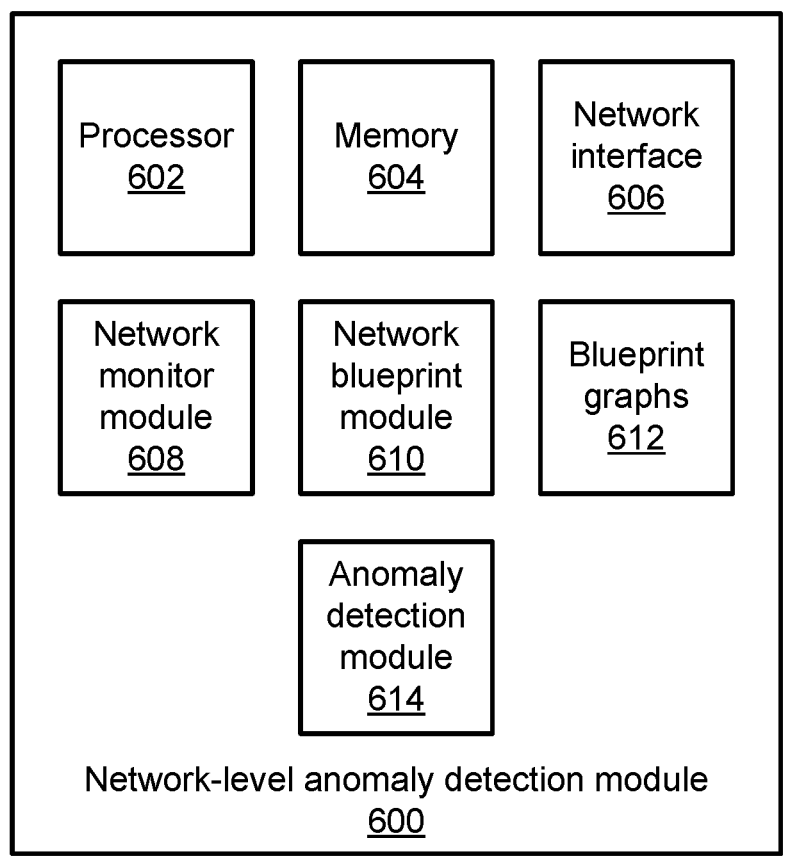
FIG. 6 is a block diagram of a system for detecting network-level anomalies in accordance with the present principles.

Referring now to FIG. 6, a network-level anomaly detection system 600 is shown. The system 600 includes a hardware processor 602 and memory 604. A network interface 606 interfaces with the enterprise network, receiving information regarding communications between hosts on the network. In addition, the system 600 includes functional modules that may, in some embodiments, be implemented as software that is stored in memory 604 and executed by hardware processor 602. In other embodiments, the functional modules may be implemented as one or more discrete hardware components in the form of, e.g., application specific integrated chips or field programmable gate arrays.

A network monitor module 608 uses the network interface 606 to gather information about network events. This event information may be supplied by the individual hosts directly to the network-level anomaly detection system 600 or may, alternatively, be determined independently. A network blueprint module 610 uses the network event information to construct and update a topology graph and a port graph (collectively blueprint graphs 612) as described above.

Anomaly detection module 614 further uses the received network event information and the blueprint graphs 612 to determine whether each network event is anomalous. If the event, with its associated nodes and edges, already exist in the blueprint graphs 612, anomaly detection module 614 determines that the event is normal and network blueprint module 610 updates the blueprint graphs 612 accordingly. If not, anomaly detection module 614 calculates a lower limit of the network event probability and compares that lower limit to a threshold. If the lower limit is below the threshold, the anomaly detection module 614 performs a complete calculation of the network event probability. In either case, if the probability (or lower limit thereof) is above the threshold, the anomaly detection module 614 determines that the event is normal. If the fully calculated probability is below the threshold, anomaly detection module 614 determines that the event is abnormal.

Figure 7:
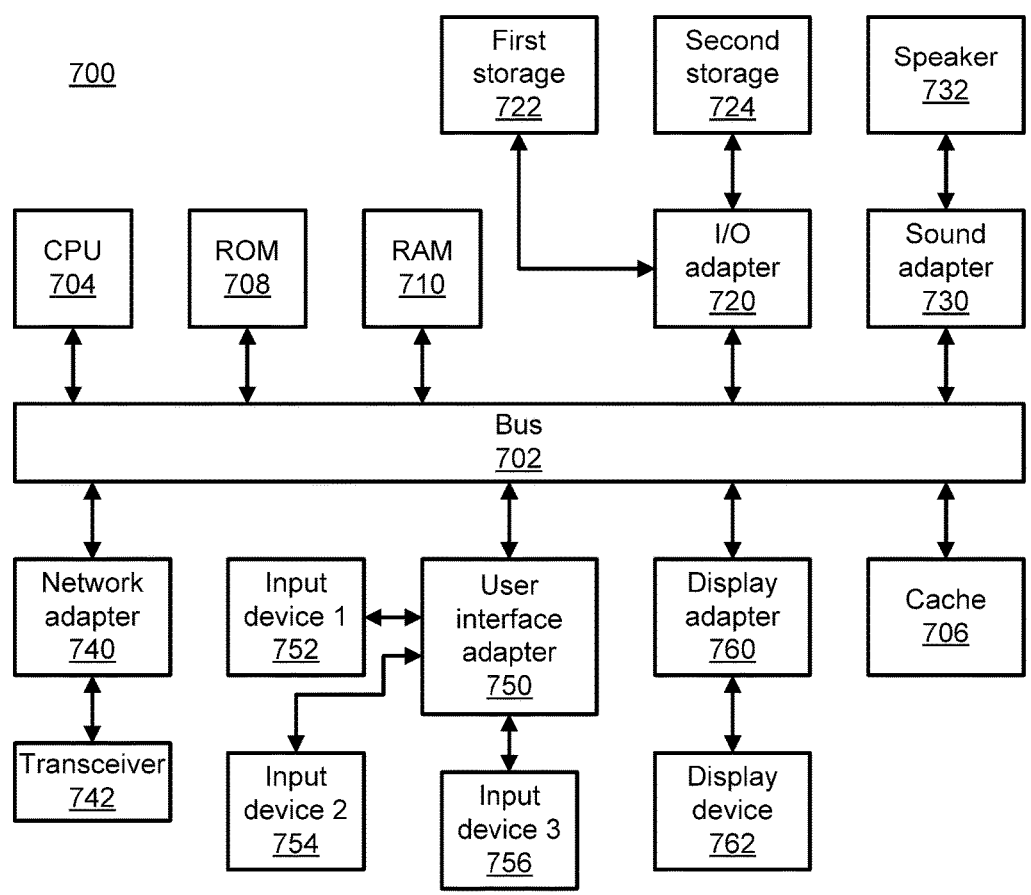
FIG. 7 is a block diagram of a processing system in accordance with the present principles.

Referring now to FIG. 7, an exemplary processing system 700 is shown which may represent the transmitting device 100 or the receiving device 120. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting anomalous network activity, comprising:
  determining that a network event does not exist within an existing topology graph, which records normal states of network connections among hosts in the network, and port graph, which records a relationship between a connection-initiating process and a destination port;
  determining a connection probability for the network event using a processor;
  determining that the connection probability is below a threshold to identify the network event as abnormal; and
  responding to abnormal network events in real-time.

2. The method of claim 1, further comprising determining a lower limit for the connection probability.

3. The method of claim 2, wherein determining the connection probability is only performed if the lower limit for the connection probability is below the threshold.

4. The method of claim 1, further comprising generating an explanation of the abnormal network event.

5. The method of claim 1, further comprising updating the topology graph and port graph if the network is not identified as abnormal.

6. The method of claim 5, wherein updating the topology graph and the port graph comprises adding nodes and edges to the topology graph and the port graph for any nodes and edges in the network event that are not already present in the topology graph and port graph.

7. The method of claim 5, wherein updating the topology graph and port graph comprises updating a last connection time timestamp for the nodes and edges of the topology graph and the port graph corresponding to the network event.

8. The method of claim 1, wherein determining the connection probability comprises determining node stability, node diversity, and node similarity.

9. A method for detecting anomalous network activity, comprising:
  determining that a network event does not exist within an existing, which records normal states of network connections among hosts in the network, and port graph, which records a relationship between a connection-initiating process and a destination port;
  determining a connection probability for the network event using a processor based on node stability, node diversity, and node similarity;

determining that the connection probability is below a threshold to identify the network event as abnormal;

generating an explanation of the abnormal network event; and responding to the abnormal network event in real-time.

10. The method of claim 9, further comprising determining a lower limit for the connection probability.

11. The method of claim 10, wherein determining the connection probability is only performed if the lower limit for the connection probability is below the threshold.

12. A system for detecting anomalous network activity, comprising:

an anomaly detection module comprising a processor configured to determine whether a network event exists within an existing topology graph, which records normal states of network connections among hosts in the network, and port graph, which records a relationship between a connection-initiating process and a destination port, to determine a connection probability for the network event if the network does not exist within the existing topology graph and port graph, to identify the network event as abnormal if the connection probability is below a threshold; and to respond to abnormal network events in real-time.

13. The system of claim 12, wherein the anomaly detection module is further configured to determine a lower limit for the connection probability.

14. The system of claim 13, wherein the anomaly detection module is further configured to determine the connection probability is only performed if the lower limit for the connection probability is below the threshold.

15. The system of claim 12, wherein the anomaly detection module is further configured to generate an explanation of the abnormal network event.

16. The system of claim 12, further comprising a blueprint graph module configured to update the topology graph and port graph if the network is not identified as abnormal.

17. The system of claim 16, wherein the blueprint graph module is further configured to add nodes and edges to the topology graph and the port graph for any nodes and edges in the network event that are not already present in the topology graph and port graph.

18. The system of claim 16, wherein the blueprint graph module is further configured to update a last connection time timestamp for the nodes and edges of the topology graph and the port graph corresponding to the network event.

19. The system of claim 12, wherein the anomaly detection module is further configured to determine node stability, node diversity, and node similarity.

* * * * *